(12) United States Patent
Hanson et al.

(10) Patent No.: US 8,783,648 B2
(45) Date of Patent: Jul. 22, 2014

(54) SYSTEM AND METHOD FOR TESTING A VALVE ACTUATOR

(75) Inventors: Garth Steven Hanson, Edmonton (CA); Thomas Joseph MacArthur, Edmonton (CA); Henri Richard Tessier, Edmonton (CA)

(73) Assignee: Cal-Scan Services Ltd., Edmonton, Alberta (CA)

( * ) Notice: Subject to any disclaimer, the term of this patent is extended or adjusted under 35 U.S.C. 154(b) by 544 days.

(21) Appl. No.: 12/986,793

(22) Filed: Jan. 7, 2011

(65) Prior Publication Data

US 2012/0175536 A1 Jul. 12, 2012

(51) Int. Cl.
*F16K 31/44* (2006.01)
(52) U.S. Cl.
USPC .............................. 251/68; 251/69
(58) Field of Classification Search
USPC .............................. 251/68, 69, 70, 71, 129.04
See application file for complete search history.

(56) References Cited

U.S. PATENT DOCUMENTS 7,556,238 B2 * 7/2009 Seberger ..................... 251/69

OTHER PUBLICATIONS

Analong Devices, Inc., "Supervisory Circuits with Watchdog and Manual Reset in 5-Lead SOT-23," ADM6316/ADM6317/ADM6318/ADM6319/ADM6320/ADM6321/ADM6322, 2004-2010.*
Sten-Halvorsen,19547, May 2008.Vidar; Koren, Evind, "All Electric Subsea Tree System," Offshore Technology Conference.*
Shafer Valve Operating Systems, "Emergency Shut-Down Control," Bulletin ESD11099.*
Argus Machine Co. Ltd., "Argus Self-Contained Hydraulic Pump Module (HPM)," 4000-2-1000-11/06, 2006.
Dresser Masoneilan, "SVI II ESD: SIL3 Partial Stroke Test Device," BW5000-ESK 6/10, 2010.
Sten-Halvorsen, Vidar; Koren, Evind, "All Electric Subsea Tree System," Offshore Technology Conference 19547, May 2008.
Shafer Valve Operating Systems, "Emergency Shut-Down Control," Bulletin ESD11099, Oct. 1999.
Bingham, Ken, "Partial Stroke Testing of Emergency Shutdown Valves: The Consequences of Failure are Far more Serious than a Disruption . . . ," PROCESSWest, pp. 49-50, 2005.

* cited by examiner

*Primary Examiner* — John K Fristoe, Jr.
*Assistant Examiner* — Kevin E Lynn
(74) *Attorney, Agent, or Firm* — Austin Rapp & Hardman

(57) ABSTRACT

A system and method for testing a valve actuator is provided, where an electrical motor is operatively connected to the valve actuator operatively connected to the valve. The system can include a main motor driver connecting the electrical motor to a primary power source, a first sensor to monitor the primary power source, a second sensor to monitor the flow of current to the electrical motor, a third sensor to monitor the angular rotation of the valve, and an emergency shut down ("ESD") controller to operate the main motor driver in the event of an alarm condition to actuate the valve to a fail-safe position. The method includes the steps of providing the system, actuating the valve, monitoring the rotation of the valve and generating an alarm if the valve does not rotate in response to the step to actuate it.

20 Claims, 3 Drawing Sheets

SYSTEM AND METHOD FOR TESTING A VALVE ACTUATOR

TECHNICAL FIELD

The present disclosure is related to the field of electric valve actuators, particular those used for surface and subsurface safety valves in oil and gas operations and more so to electrically-actuated valves used in a system as a Emergency Shut Down fail safe feature, in particular, systems and methods for testing the valve actuators.

BACKGROUND

An electric Emergency Shut-Down ("ESD") valve actuator is relied upon to actuate a valve to a fail-safe position in the event of a system control failure. An example of such a system failure would be when a separator floods on an oil or gas well. When the master control system detects such a control failure, it can actuate the ESD to the fail-safe position stopping the flow of incoming oil or gas. As a critical element in a safety system, it is important that the ESD valve works correctly in all situations, even if abnormal. There are four abnormal major failure modes in a typical system protected with an electrical ESD valve. The first, when the main power fails, can be solved with either a mechanical or battery-based backup energy storage system that has enough energy to actuate the valve when this failure occurs. The other three failure modes occur when the ESD controller, the backup energy source or the master controller fails. If any of these three items cease to function, the fail-safe feature will compromised and catastrophic failure can occur. In systems where this failure cannot be tolerated, it is important to minimize the risk of any of these three failure modes occurring.

It is, therefore, desirable to provide a system and method that can minimize these risks.

SUMMARY

A system and method for testing a valve actuator is provided. In some embodiments, the system can comprise an electrical valve actuator that can test itself automatically for common failures and detect when the system controller that normally actuates the valve fails. This can be useful when electrically actuated valves are used in Emergency Shut Down ("ESD") systems, where system failure cannot be tolerated and risk reduction is necessary. In some embodiments, an electrical ESD controller with four safety mechanisms can be provided that can be used in whole or in part to lower such risk depending on the situation.

In some embodiments, ESD failure detection can be provided by an ESD controller periodically testing the ESD valve to ensure it can actuate. The detection can be done by measuring the angular position of the valve and/or by monitoring the current draw by the electric motor that actuates the valve. If failure is detected, a alarm condition can be sent to a master controller.

In some embodiments, the ESD backup energy supply can be tested periodically to verify that it has enough energy to actuate the valve if the main power fails. Like a valve failure, the system master controller can be informed of the alarm condition upon detection of a malfunctioning energy storage device.

In some embodiments, the ESD controller can be protected by an external watchdog circuit that can detect a failure of the ESD controller. If not reset by the ESD controller periodically to indicate that the ESD controller is operating, the external watchdog circuit can be capable of separately actuating the valve to the fail-safe position.

In some embodiments, the ESD controller can further comprise a separate master controller watchdog that can be reset by the master controller. If the master controller ceases to function, the ESD controller can actuate the valve to the fail-safe position.

Broadly stated, in some embodiments, a system is provided for actuating a valve comprising an electrical motor operatively connected to a valve actuator operatively connected to the valve, the system comprising: a main motor driver operatively connecting the electrical motor to a primary power source, the main motor driver configured to control the flow of current from the primary power source to the electrical motor; a first sensor configured to monitor the voltage of the primary power source; a second sensor configured to monitor the flow of current from the main motor driver to the electrical motor; a third sensor configured to monitor the angular rotation of the valve; and an emergency shut down ("ESD") controller operatively connected to the main motor driver, the first sensor, the second sensor and the third sensor, the ESD controller configured to operate the main motor driver in the event of an alarm condition to actuate the valve to a fail-safe position.

Broadly stated, in some embodiments, a method is provided for testing a valve actuator operatively connected to a valve, the valve actuator comprising an electrical motor operatively connected thereto, the method comprising the steps of: providing a system comprising: a main motor driver operatively connecting the electrical motor to a primary power source, the main motor driver configured to control the flow of current from the primary power source to the electrical motor, a first sensor configured to monitor the voltage of the primary power source, a second sensor configured to monitor the flow of current from the main motor driver to the electrical motor, a third sensor configured to monitor the angular rotation of the valve, and an emergency shut down ("ESD") controller operatively connected to the main motor driver, the first sensor, the second sensor and the third sensor, the ESD controller configured to operate the main motor driver in the event of an alarm condition to actuate the valve to a fail-safe position; actuating the valve; monitoring the angular rotation of the valve; and generating an alarm if the valve does not rotate in response to the step to actuate the valve.

Broadly stated, in some embodiments, a system is provided for testing a valve actuator operatively connected to a valve, the valve actuator comprising an electrical motor operatively connected thereto, the system comprising: first means for controlling the flow of current from a primary power source to the electrical motor; means for monitoring the voltage of the primary power source; means for monitoring the flow of current from the primary power source through the first controlling means to the electrical motor; means for monitoring the angular rotation of the valve; means for actuating the valve to a fail-safe position in the event of an alarm condition; and means for generating an alarm in the event that the valve cannot be actuated to the fail-safe position.

Broadly stated, in some embodiments, a method is provided for testing a backup power source operatively connected to a valve actuator, the valve actuator operatively connected to a valve, the valve actuator comprising an electrical motor operatively connected thereto, the method comprising the steps of: providing a system comprising: a main motor driver operatively connecting the electrical motor to a primary power source, the main motor driver configured to control the flow of current from the primary power source to the electrical motor, a first sensor configured to monitor the voltage of the primary power source, a second sensor configured to monitor the flow of current from the main motor driver to the electrical motor, a third sensor configured to monitor the angular rotation of the valve, and an emergency shut down ("ESD") controller operatively connected to the main motor driver, the first sensor, the second sensor and the third sensor, the ESD controller configured to operate the main motor driver in the event of an alarm condition to actuate the valve to a fail-safe position; disconnecting the primary power source; actuating the valve with the backup power source; monitoring the angular rotation of the valve; and generating an alarm if the valve does not rotate in response to the step to actuate the valve.

DETAILED DESCRIPTION OF EMBODIMENTS

Figure 1:
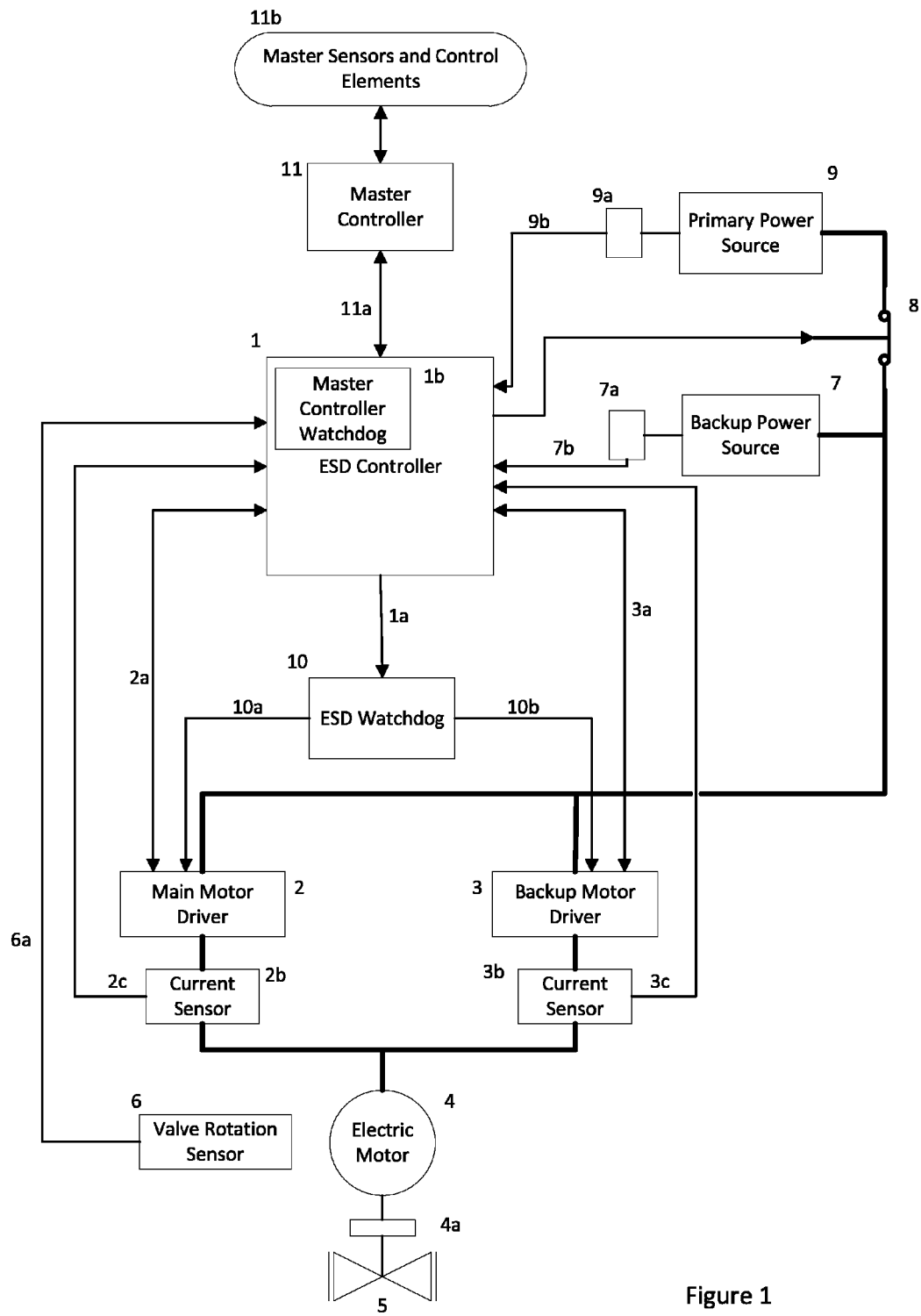
FIG. 1 is a block diagram depicting a system for testing and actuating a valve.

Referring to FIG. 1, a block diagram of a system for testing and actuating a valve is shown. In normal operation, ESD controller 1 can open and close valve 5 via electric motor 4. When master controller 11 receives information from sensors 11b such that valve 5 needs to be closed, master controller 11 can send a signal via communication path 11a to ESD controller 1. Upon receiving a valid command from master controller 11, ESD controller 1 can transmit a signal via signal path 2a to main motor driver 2 to supply power to electric motor 4 to actuate the valve 5 via valve actuator 4a.

In order to verify that valve 5 can be actuated in the event of a emergency, valve 5 can be periodically tested for actuation failure. In order to determine if valve 5 can be actuated, position sensor 6 can be used to send a signal corresponding to the angular position of valve 5 via signal path 6a to ESD controller 1. If valve 5 has failed to actuate, or if valve position sensor 6 itself has failed, an alarm condition can be sent from ESD controller 1 to master controller 11 via signal path 11a. What actually failed depends on the feedback signal received from valve position sensor 6 and motor current sensor 2b via signal path 2c. If valve 5 cannot mechanically turn, and there is a high current measured by current sensor 2b, a locked rotor condition alarm can be generated. If current sensor 2b senses that the current flowing to motor 4 is too low, this can indicate either a failure of electric motor 4 or of main motor driver 2. In both conditions, an alarm can also be generated. In addition, backup motor driver 3 can be activated to attempt to actuate valve 5 via backup motor driver 3 as a backup to main motor driver 2. In this situation, current sensor 3b can monitor the current flowing to motor 4 and send a feedback signal to ESD controller 1 via signal path 3c.

To verify that the mechanical or electrical back up power supply 7 has enough energy to actuate valve 5, a test can be carried out wherein switch 8 can be opened to disconnect the main power supply. In some embodiments, backup power supply 7 can comprise a mechanical backup power source (not shown) such as a spring-operated or functionally equivalent biasing mechanism as well known to those skilled in the art that can operate valve actuator 4a. In other embodiments, the mechanical backup power source can further comprise a reset mechanism that can reset the spring or biasing mechanism to an "armed" position wherein the spring or biasing mechanism is set to operate valve actuator 4a again.

ESD controller 1 can monitor valve 5 if it has actuated from the signal received from sensor 6. If the test fails, then an alarm condition can be sent from ESD controller 1 to the main controller 11 via 11a. If backup power source 7 comprises an electric backup power supply, testing can be done by opening switch 8 to disconnect main power supply 9. Then, ESD controller 1 can either use a built in load resistor to test the current flow from backup power source 7, or activate main motor driver 2 via communication path 2a to provide an electrical load to backup power source 7. By monitoring the current flow with current sensor 2b and the voltage of backup power source 7 with voltage sensor 7a operatively connected to ESD controller 1 via signal path 7b, ESD controller 1 can determine whether backup power source 7 can operate when needed (ie, is "good") or whether backup power source 7 is failing or has failed.

To detect when ESD controller 1 itself has failed, the system can comprise, in some embodiments, external ESD controller watchdog 10. In other embodiments, ESD controller watchdog 10 can be embodied, embedded or integrated functionally or physically in ESD controller 1. ESD controller 1 can communicate with ESD controller watchdog 10 via signal path 1a to determine whether ESD controller 1 is functioning correctly. When ESD controller watchdog 10 no longer received communication from ESD controller 1 on signal path 1a, ESD controller watchdog 10 can conclude that ESD controller 1 has failed. In this event, ESD controller watchdog 10 can independently actuate valve 5 via signals sent along signal path 10a to main motor driver 2 to operate valve 5 to the fail-safe position. In the event that main motor driver 2 has failed or is inoperable, ESD watchdog can independently actuate valve 5 via signals sent along signal path 10b to backup motor driver 3 to operate valve 5 to the fail-safe position.

In normal operation, a periodic signal can be transmitted to ESD controller 1 from master controller 11 to master controller watchdog 1b via signal path 11a to indicate that main system controller 11 is operating correctly. In the event of a failure of the periodic signal from master controller 11 to master controller watchdog 1b disposed within ESD controller 1, which can indicate a failure of master controller 11, ESD controller 1 can actuate valve 5 to the fail-safe position via a signal sent along signal path 2a to main motor driver 2 to supply current to motor 4 to actuate valve 5.

In some embodiments, the system can detect when there is a failure of primary power supply 9. Voltage sensor 9a can monitor the voltage of primary power source 9. When the voltage of primary power source changes or drops, sensor 9a can send a signal to ESD controller 1 via signal path 9b to indicate an alarm condition. ESD controller 1 can then actuate valve 5 to the safe position.

In some embodiments, each of ESD controller 1 and ESD controller watchdog 10 can comprise discrete electronic or electro-mechanical components, such as transistors, field-effect transistors ("FETS"), diodes, triacs, optocouplers, operational amplifiers, relays, solenoids, resistors, capacitors and inductors, and any other discrete or integrated electronic device or component as well known to those skilled in the art wherein ESD controller watchdog 10 can operate either of main motor driver 2 or backup motor driver 3 in response to a triggering event as discussed above. In other embodiments, either or both of ESD controller 1 and ESD controller watchdog 10 can comprise a microprocessor, a microcontroller, integrated logic circuits, timer circuits, programmable gate arrays, field-programmable gate arrays or application specific analogue devices as well known to those skilled in the art. In representative embodiments, ESD controller watchdog 10 can comprise a model ADM6316 series supervisory circuit as manufactured by Analog Devices, Inc. of Norwood, Mass., U.S.A. In further embodiments, ESD controller 1 can comprise any or all of the aforementioned electronic components and devices in combination, as well known to those skilled in the art.

Figure 2:
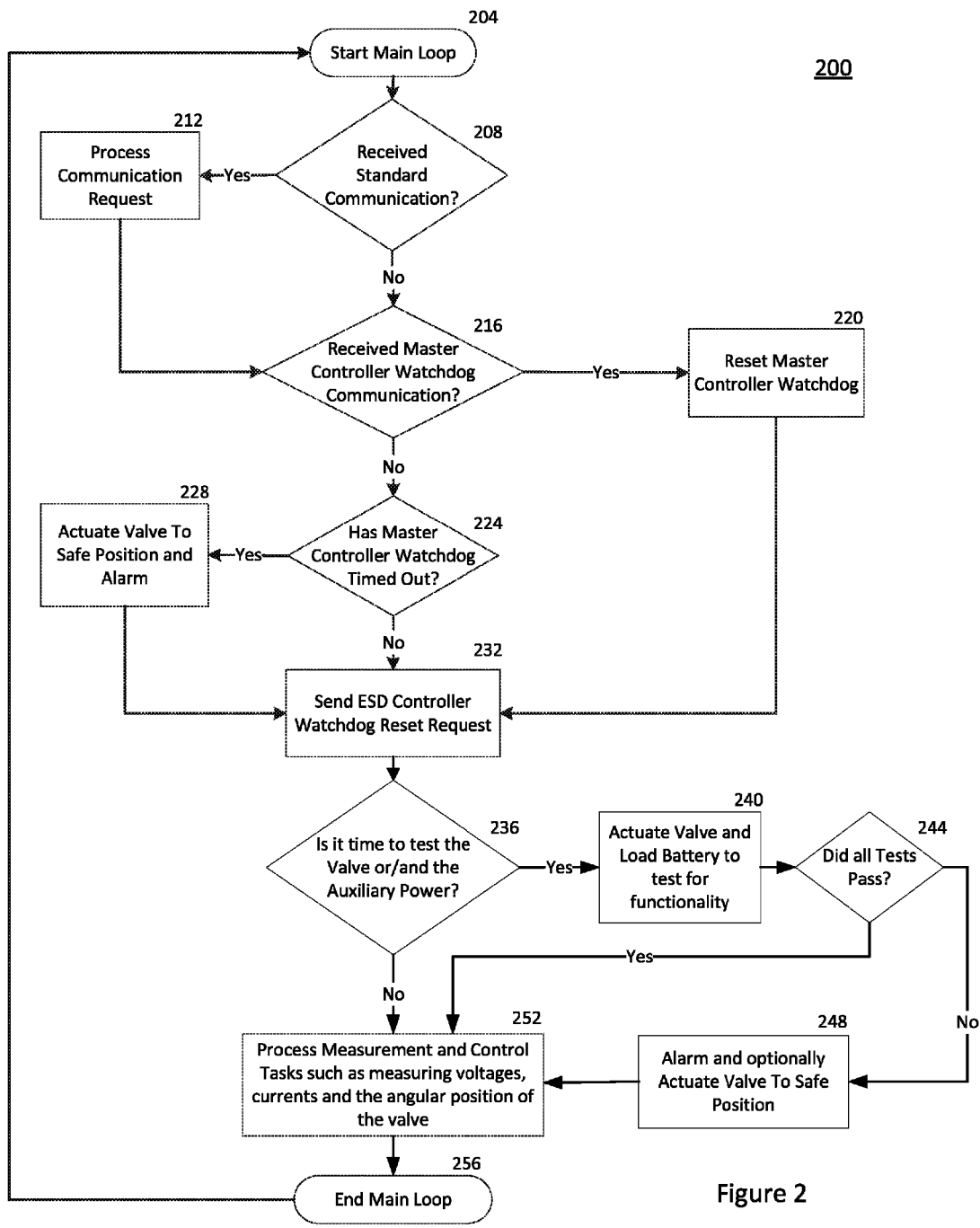
FIG. 2 is a flowchart depicting the operation of an emergency shutdown controller.

Referring to FIG. 2, a flowchart of process 200 that can be carried by ESD controller 1 in some embodiments is shown. Process 200 can begin at step 204 and then carry out step 208 where ESD controller 1 can query whether a standard communication has been received from master controller 11. If "yes", then ESD controller 1 can carry out any process as set out in the standard communication at step 212. If "no", then ESD controller 1 can determine whether master controller watchdog 1b has received communication from master controller 11 at step 216. If "yes", then master controller watchdog 1b can be reset at step 220 whereupon ESD controller 1 can proceed to step 232. If "no", then ESD controller 1 can determine whether master controller watchdog 1b has timed out at step 224. If "yes", then ESD controller 1 can proceed to actuate valve 5 to a safe position and generate an alarm at step 228, and then proceed to step 232. If "no", ESD controller 1 can proceed to step 232.

At step 232, ESD controller 1 can send a reset request to ESD controller watchdog 10 and then proceed to step 236. At step 236, ESD controller 1 can determine whether it is time to run a test procedure, such as testing the operation of valve 5 or testing backup power source 7. If the answer to the query at step 236 is "yes", then ESD controller 1 can carry out the testing procedure or operation at step 240. At step 244, a query can be made to determine if the testing procedure or operation passed. If "yes", process 200 can proceed to step 252. If "no", ESD controller 1 can generate an alarm and optionally actuate valve 5 to a safe position at step 248 and then proceed to step 252. If the answer to the query at step 236 is "no", then process 200 can proceed to step 252.

At step 252, ESD controller 1 can carry out other process measurement and control tasks, which can include measuring voltages and currents and detecting the angular position of valve 5 from the sensors disposed in the system. After step 252, process 200 can proceed to step 256 where it can then loop back to step 204 and repeat itself.

Figure 3:
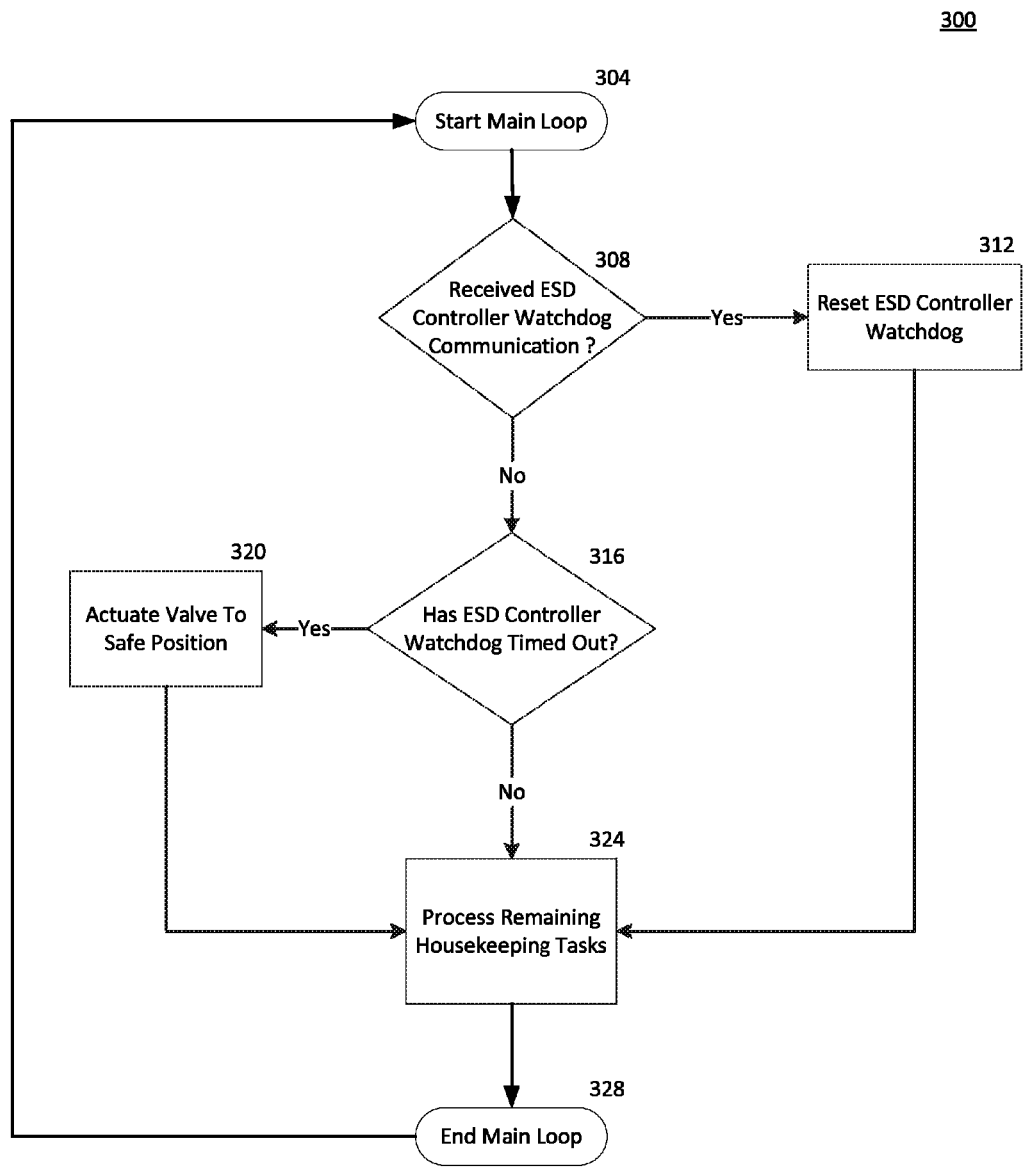
FIG. 3 is a flowchart depicting the operation of an emergency shutdown watchdog.

Referring to FIG. 3, a flowchart of process 300 that can be carried by ESD controller watchdog 10 in some embodiments is shown. Process 300 can begin at step 304 and then carry out step 308 where ESD controller watchdog 10 can query whether it has received communication from ESD controller 1 along signal path 1a. If "yes", then ESD controller watchdog 10 can be reset at step 312, and process 300 can then proceed to step 324. If "no", then a query can be made at step 316 to determine if ESD controller watchdog 10 has timed out. If "yes", then ESD watchdog 10 can actuate valve 5 to a safe position at step 320. If "no", then process 300 can proceed to step 324. At step 324, ESD controller watchdog 10 can then carry out any remaining housekeeping tasks as programmed therein. After step 324, process 300 can then proceed to step 328 where it can then loop back to step 304 and repeat itself.

In some embodiments, either or both of master controller watchdog 1b and ESD controller watchdog 10 can comprise discrete active and passive electronic components or integrated analogue and/or digital electronic devices and components, or a combination thereof, as well known to those skilled in the art, wherein watchdogs 1b and 10 can be external or not integrated with ESD controller 1. In other embodiments, either or both of master controller watchdog 1b and ESD controller watchdog 10 can be integrated or embedded in ESD controller 1, either in terms of electronic components or embodied as "virtual components or circuits" wherein the functions of watchdogs 1b or 10 can be carried out by a microprocessor or microcontroller disposed in ESD controller 1 following a series of steps programmed in a computer-readable memory disposed thereon or therein, as well known to those skilled in the art.

Although a few embodiments have been shown and described, it will be appreciated by those skilled in the art that various changes and modifications might be made without departing from the scope of the invention. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

We claim:

1. A system for actuating a valve comprising an electrical motor operatively connected to a valve actuator operatively connected to the valve, the system comprising:
   a) a main motor driver operatively connecting the electrical motor to a primary power source, the main motor driver configured to control the flow of current from the primary power source to the electrical motor;
   b) a first sensor configured to monitor the voltage of the primary power source;
   c) a second sensor configured to monitor the flow of current from the main motor driver to the electrical motor;
   d) a third sensor configured to monitor the angular rotation of the valve;
   e) an emergency shut down ("ESD") controller operatively connected to the main motor driver, the first sensor, the second sensor and the third sensor, the ESD controller configured to operate the main motor driver in the event of an alarm condition to actuate the valve to a fail-safe position; and
   f) an ESD watchdog operatively connected to the ESD controller and the main motor driver, the ESD watchdog configured to operate the main motor driver in the event of the alarm condition to actuate the valve to the fail-safe position.

2. The system as set forth in claim 1, wherein the ESD controller is operatively connected to a master controller, the system further comprising a master controller watchdog disposed in the ESD controller, the master controller watchdog configured to operate the ESD controller to actuate the valve to the fail-safe position when the master controller watchdog detects a failure of the master controller.

3. The system as set forth in claim 1, further comprising a backup power source configured to provide power to actuate the valve to the fail-safe position when the primary power source fails.

4. The system as set forth in claim 3, wherein the backup power source comprises a mechanical power source configured to actuate the valve.

5. The system as set forth in claim 3, wherein the backup power source comprises an electrical power source.

6. The system as set forth in claim 1, further comprising:
   a) a backup motor driver operatively connecting the electrical motor to the primary power source, the backup motor driver configured to control the flow of current from the primary power source to the electrical motor, the backup motor driver operatively connected to the ESD controller; and b) a fourth sensor configured to monitor the flow of current from the backup motor driver to the electrical motor.

7. The system as set forth in claim 6, wherein the ESD watchdog is operatively connected to the backup motor driver, the ESD watchdog configured to operate the backup motor driver in the event of the alarm condition to actuate the valve to the fail-safe position.

8. A method for testing a valve actuator operatively connected to a valve, the valve actuator comprising an electrical motor operatively connected thereto, the method comprising the steps of:
   a) providing a system comprising:
      i) a main motor driver operatively connecting the electrical motor to a primary power source, the main motor driver configured to control the flow of current from the primary power source to the electrical motor,
      ii) a first sensor configured to monitor the voltage of the primary power source,
      iii) a second sensor configured to monitor the flow of current from the main motor driver to the electrical motor,
      iv) a third sensor configured to monitor the angular rotation of the valve,
      v) an emergency shut down ("ESD") controller operatively connected to the main motor driver, the first sensor, the second sensor and the third sensor, the ESD controller configured to operate the main motor driver in the event of an alarm condition to actuate the valve to a fail-safe position, and
      vi) an ESD watchdog operatively connected to the ESD controller and the main motor driver, the ESD watchdog configured to operate the main motor driver in the event of the alarm condition to actuate the valve to the fail-safe position;
   b) actuating the valve;
   c) monitoring the angular rotation of the valve; and
   d) generating an alarm if the valve does not rotate in response to the step to actuate the valve.

9. The method as set forth in claim 8, wherein the ESD controller is operatively connected to a master controller, the system further comprising a master controller watchdog disposed in the ESD controller, the master controller watchdog configured to operate the ESD controller to actuate the valve to the fail-safe position when the master controller watchdog detects a failure of the master controller.

10. The method as set forth in claim 8, wherein the system further comprises a backup power source configured to provide power to actuate the valve to the fail-safe position when the primary power source fails.

11. The method as set forth in 10, wherein the backup power source comprises a mechanical power source configured to operate the valve actuator.

12. The method as set forth in 10, wherein the backup power source comprises an electrical power source.

13. The method as set forth in claim 8, wherein the system further comprises:
   a) a backup motor driver operatively connecting the electrical motor to the primary power source, the backup motor driver configured to control the flow of current from the primary power source to the electrical motor, the backup motor driver operatively connected to the ESD controller; and
   b) a fourth sensor configured to monitor the flow of current from the backup motor driver to the electrical motor.

14. The method as set forth in claim 13, wherein the ESD watchdog is operatively connected to the backup motor driver, the ESD watchdog configured to operate the backup motor driver in the event of the alarm condition to actuate the valve to the fail-safe position.

15. A method for testing a backup power source operatively connected to a valve actuator, the valve actuator operatively connected to a valve, the valve actuator comprising an electrical motor operatively connected thereto, the method comprising the steps of:
   a) providing a system comprising:
      i) a main motor driver operatively connecting the electrical motor to a primary power source, the main motor driver configured to control the flow of current from the primary power source to the electrical motor,
      ii) a first sensor configured to monitor the voltage of the primary power source,
      iii) a second sensor configured to monitor the flow of current from the main motor driver to the electrical motor,
      iv) a third sensor configured to monitor the angular rotation of the valve,
      v) an emergency shut down ("ESD") controller operatively connected to the main motor driver, the first sensor, the second sensor and the third sensor, the ESD controller configured to operate the main motor driver in the event of an alarm condition to actuate the valve to a fail-safe position, and
      vi) an ESD watchdog operatively connected to the ESD controller and the main motor driver, the ESD watchdog configured to operate the main motor driver in the event of the alarm condition to actuate the valve to the fail-safe position;
   b) disconnecting the primary power source;
   c) actuating the valve with the backup power source;
   d) monitoring the angular rotation of the valve; and
   e) generating an alarm if the valve does not rotate in response to the step to actuate the valve.

16. The method as set forth in claim 15, wherein the ESD controller is operatively connected to a master controller, the system further comprising a master controller watchdog disposed in the ESD controller, the master controller watchdog configured to operate the ESD controller to actuate the valve to the fail-safe position when the master controller watchdog detects a failure of the master controller.

17. The method as set forth in claim 15, wherein the system further comprises:
   a) a backup motor driver operatively connecting the electrical motor to the primary power source, the backup motor driver configured to control the flow of current from the primary power source to the electrical motor, the backup motor driver operatively connected to the ESD controller; and
   b) a fourth sensor configured to monitor the flow of current from the backup motor driver to the electrical motor.

18. The method as set forth in claim 17, wherein the ESD watchdog is operatively connected to the backup motor driver, the ESD watchdog configured to operate the backup motor driver in the event of the alarm condition to actuate the valve to the fail-safe position.

19. The method as set forth in claim 15, wherein the backup power source comprises an electrical power source.

20. The method as set forth in claim 15, wherein the backup power source comprises a mechanical power source configured to operate the valve actuator.

* * * * *